No. 723,033. PATENTED MAR. 17, 1903.
C. F. ROUX.
HOG NOSE CUTTER.
APPLICATION FILED DEC. 13, 1902.
NO MODEL.
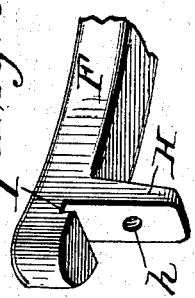
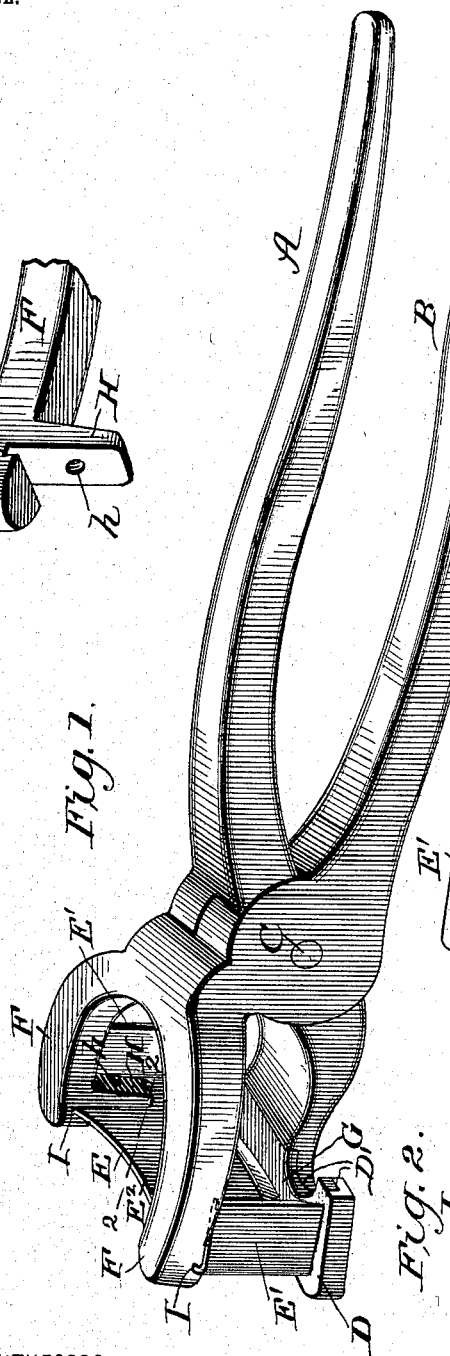
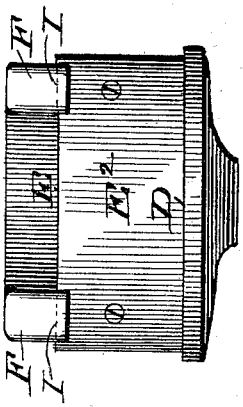
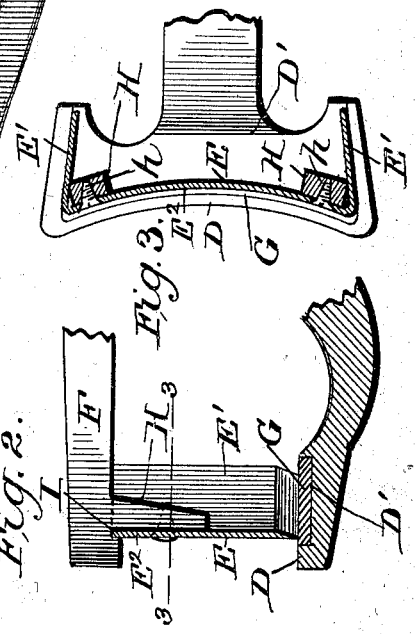
WITNESSES:
Jos. A. Ryan
Perry B. Turpin
INVENTOR
Charles F. Roux
BY Munn & Co.
ATTORNEYS.

UNITED STATES PATENT OFFICE.

CHARLES F. ROUX, OF STRYKER, OHIO, ASSIGNOR OF ONE-HALF TO ROBERT H. BETTS, OF ARCHBOLD, OHIO.

HOG-NOSE CUTTER.

SPECIFICATION forming part of Letters Patent No. 723,033, dated March 17, 1903.

Application filed December 13, 1902. Serial No. 135,059. (No model.)

*To all whom it may concern:*

Be it known that I, CHARLES F. ROUX, a citizen of the United States, and a resident of Stryker, in the county of Williams and State of Ohio, have made certain new and useful Improvements in Hog-Nose Cutters, of which the following is a specification.

My invention is an improvement in devices for cutting off the nose of a hog or that part with which the hog roots, and has for an object, among others, to provide a simple device by which to cut away the entire rooting portion of the nose of a hog; and the invention consists in certain novel constructions and combinations of parts, as will be hereinafter described and claimed.

In the drawings, Figure 1 is a perspective view of my improved cutter. Fig. 2 is a sectional view on about line 2 2 of Fig. 1, parts being broken away. Fig. 3 is a horizontal section on about line 3 3 of Fig. 2. Fig. 4 is an end elevation of the cutter, and Fig. 5 is a detail perspective view of the end of one of the arms for supporting the knife.

The handles A and B are pivoted together at C and extend beyond said pivot, with the handle A supporting at its front end the bed-plate D, against which the blade E cuts, and the handle B being extended beyond its pivot and provided with the curved arms F, to which the opposite ends of the cutter E are secured, as will be presently described. The bed-plate D may be recessed at D' to receive a cushion G, which may be of lead or other soft metal or of rubber or the like, as desired, and which being seated in the said recess D' will be held in place and can be conveniently removed and renewed whenever desired.

The blade E is of a special construction, being preferably curved from end to end and provided at its ends with rearwardly-projecting wings E', whose lower edges coincide with that of the main portion of the blade and cooperate therewith in notching or otherwise marking the ears of the animal when desired. The returned portions E' form, with the body $E^2$ of the blade, angles at the ends of the blade which fit the depending lugs H, provided near the free ends of the arms F, said lugs being perforated at $h$ for the passage of the rivets which secure the blade in place, and grooves I being provided in the under faces of the arms F adjacent to the said lugs and forming seats for the upper edge of the body portion $E^2$ of the blade when the same is applied as shown. The wings E' fit along the outer side of the depending lugs H and extend at their free edges beneath the arms F, as best shown in Fig. 1, so that the pressure exerted on the handle will be borne by the body portion of the blade and also by the wings through the bearing of said wings below the arms F of the handle B, as shown and before described. The arms F are spaced apart, and the space between said arms is open and unobstructed, so the operator can look between the said arms to the body portion $E^2$ of the plate and see just where the blade is cutting, which is important, so as to avoid any unnecessary mutilation of the animal, and enables the operator to cut off the entire rooting portion of the nose without injuring the animal in any way.

It is important in cutting the hog's nose to cut off all the rooting portion and to entirely remove the same, as if portions of the gristle are left at one or both sides the hog will proceed to root with such portions, and therefore I provide my device with the cutting-blade so curved and extended as to cut away all the rooting portion of the nose, and by making the arms which support the blade separated or spaced apart, as shown, the operator can see at a glance just where to set the knife back of the rooting portion before cutting the same off. It will also be noticed that my improvement combines in one implement a hog-nose cutter and an ear-marker.

Having thus described my invention, what I claim as new, and desire to secure by Letters Patent, is—

1. An implement for removing the rooting portions of hogs' noses, comprising a pair of handles pivoted together, one of said handles being provided in advance of the pivot with a base or abutment for the blade and the other handle being provided with arms spaced apart and provided near their free ends with depending lugs and in their under sides adjacent to said lugs with grooves leading from side to side, and the blade having a body portion fitting at its upper edge in the said grooves, and wings extending from the ends of said body portion rearwardly alongside the depending lugs, and projecting in rear of said lugs beneath the spaced-apart arms whereby the pressure exerted on said arms will be borne by the body portion and wings of the cutting-blade, substantially as set forth.

2. The combination in an implement substantially as described, of the handles pivoted together, one of which is provided with arms spaced apart and having depending lugs and adjacent thereto grooves extending from side to side, and the blade having a body portion fitted at its upper edge in said grooves and wings extending along the outer sides of the lugs, substantially as set forth.

3. The combination of the blade-supporting arms, spaced apart and provided with depending lugs near their free ends, and the blade extending between the said arms, and secured to such lugs, and a base or abutment for said blade, substantially as set forth.

4. The combination of the arms spaced apart, and provided with depending lugs arranged slightly back from their free ends providing extensions beyond said lugs, the blade extending between said arms and bearing beneath said extensions and secured to the lugs, and a base or abutment for said blade, substantially as set forth.

5. An implement substantially as described comprising a pair of handles pivoted together, one of said handles having a base or abutment for the blade and the other having arms spaced apart, and the blade held to said arms and having at its ends returned portions extending beneath the arms substantially as set forth.

CHARLES F. ROUX.

Witnesses:
J. R. BARNUM,
J. E. MEEK.